United States Patent
Simpson et al.

(10) Patent No.: US 8,178,212 B2
(45) Date of Patent: May 15, 2012

(54) FUNCTIONALLY GRADED HIGH TEMPERATURE BONDING OF FIBERGLASS FIBERS TO STEEL

(75) Inventors: Allen H. Simpson, Buchanan, MI (US); Mark L. La Forest, Granger, IN (US); Alexander Mukasyan, Granger, IN (US)

(73) Assignees: Honeywell International Inc., Morristown, NJ (US); The University of Notre Dame du Lac, Notre Dame, IN (US)

( * ) Notice: Subject to any disclaimer, the term of this patent is extended or adjusted under 35 U.S.C. 154(b) by 856 days.

(21) Appl. No.: 12/258,115

(22) Filed: Oct. 24, 2008

(65) Prior Publication Data
US 2010/0104886 A1    Apr. 29, 2010

(51) Int. Cl.
*B22F 1/02* (2006.01)
*B22F 7/00* (2006.01)
*B22F 7/02* (2006.01)
*B22F 7/04* (2006.01)

(52) U.S. Cl. ............ 428/570; 419/6; 419/7; 419/8; 419/9; 419/10; 75/255; 428/621

(58) Field of Classification Search .............. None
See application file for complete search history.

(56) References Cited

U.S. PATENT DOCUMENTS

| 5,288,354 | A | 2/1994 | Harris et al. |
| 6,500,557 | B1 * | 12/2002 | Koizumi et al. ............ 428/469 |
| 6,698,645 | B1 | 3/2004 | Buchberger et al. |
| 6,736,942 | B2 | 5/2004 | Weihs |
| 6,922,517 | B2 | 7/2005 | Matsueda et al. |
| 2005/0039836 | A1 | 2/2005 | Dugan et al. |
| 2007/0235126 | A1 | 10/2007 | Simpson et al. |
| 2008/0011756 | A1 | 1/2008 | Lee et al. |

FOREIGN PATENT DOCUMENTS
EP    1 153 698 A1    11/2001

* cited by examiner

*Primary Examiner* — Jennifer McNeil
*Assistant Examiner* — Clarisa M Carrizales
(74) *Attorney, Agent, or Firm* — Shumaker & Sieffert, P.A.

(57) ABSTRACT

Method for chemical bonding of fiberglass fibers to steel surfaces to prepare the steel for bonding with carbon composite material. This fiber-bonding step greatly increases the strength of the subsequent metal-composite bond. The fiberglass fibers which are chemically bonded to the steel provide a high surface area interface to entangle with carbon fibers in the composite component, and thereby inhibit crack formation on the boundary surface between the steel and composite components when they are bonded together.

20 Claims, 5 Drawing Sheets

FUNCTIONALLY GRADED HIGH TEMPERATURE BONDING OF FIBERGLASS FIBERS TO STEEL

FIELD OF THE INVENTION

This invention relates to the bonding of non-reactive fibers such as fiberglass fibers to steel or other metals, and to metal-hybrid composite articles made by such methods. Chemical bonding of the fiberglass fibers to a steel surface prepares the steel article for bonding with a carbon composite material. The resulting metal-composite hybrid articles are strong, durable, and resistant to damage from mismatches in coefficients of thermal expansion.

BACKGROUND OF THE INVENTION

Conventionally, when manufacturing metal-hybrid composites, attachment of non-reactive fibers to metals is an important issue. For materials used at temperatures below 250° C., adhesives are readily available. For metal-hybrid composites being used at higher use temperatures, however, off-the-shelf adhesives are not generally satisfactory.

There are extensive publications concerning various methods of bonding reactive fibers to metals. The following publications, some of which disclose such methods, constitute background for the present invention: U.S. Pat. No. 6,698,645 B1, entitled 'Method of Producing Fiber-Reinforced Metallic Building Components'; US 2008/0011756 A1, entitled 'Liquid Tight Sealing of Heat-Insulating Walls of a Liquified Natural Gas Carrier'; U.S. Pat. No. 6,922,517 B2, entitled 'Quickly Bonding Optical Fiber Anchor Device Permitting Fibers to Remain Linear'; U.S. Pat. No. 5,288,354,entitled 'Method of Bonding Self-Lubricating Fibers to an External Surface of a Substratum'; EP 1 153 698 A1, entitled 'Article Comprising Creep-Resistant and Stress-Reducing Solder'; US 2005/0039836 A1, entitled 'Multi-Component Fibers, Fiber-Containing Materials Made from Multi-Component Fibers and Methods of Making the Fiber-Containing Materials'; and US 2007/0235126 A1, entitled 'Bonding of Carbon-Carbon Composites Using Titanium Carbide'.

SUMMARY OF THE INVENTION

The present invention provides a method for chemically bonding fiberglass fibers to steel surfaces in order to prepare the steel for bonding with carbon composite material. This fiber-bonding step greatly increases the strength of the subsequent metal-composite bond. The fiberglass fibers that are chemically bonded to the steel in accordance with the present invention provide a high surface area interface to entangle with carbon fibers in the composite component. This approach inhibits crack formation on the boundary surface between steel and composite components when they are bonded together.

The present invention uses a combustion-based method to bond non-reactive fibers such as fiberglass to steel or other metals. This invention uses three layers of carefully selected reactive material to create a functionally graded bond that is strong, durable, and resistant to damage from coefficient of thermal expansion ("CTE") mismatches. After the fiberglass fibers are bonded to the metal, one may then "wind" the metal skeleton with glass fiber or carbon fiber. A next step would be to infuse and mold with phenolic or with epoxy.

BRIEF DESCRIPTION OF THE DRAWINGS

These and other aspects and features of embodiments of the invention will be better understood after a reading of the following detailed description together with the accompanying drawings. The drawings are presented solely in order to illustrate the invention, and are not intended to be limiting thereof.

FIG. 2A shows the steel skeleton. FIG. 2B shows the carbon composite in place "transparently" surrounding the steel skeleton, with the skeleton being shown within the carbon composite overlayer. FIG. 2C shows the same view as FIG. 2B, but in FIG. 2C the composite is not transparent.

DETAILED DESCRIPTION OF THE INVENTION

Figure 1:
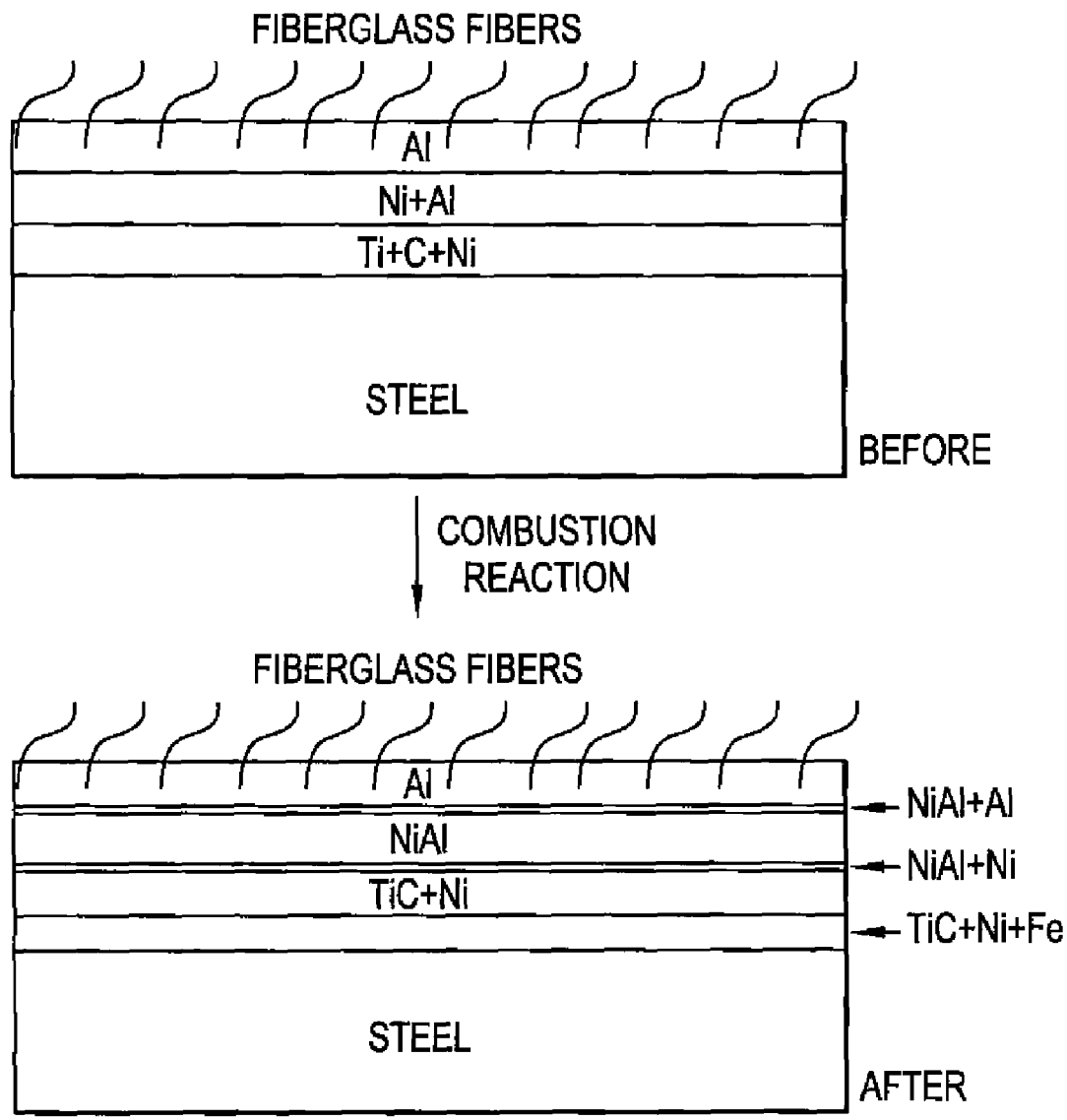
FIG. 1 schematically illustrates the use of three layers of materials to bond steel to glass fibers.

This invention uses three layers of materials to bond steel to fiberglass fibers (see FIG. 1). The reaction in accordance with the present invention must be carried out at a temperature which is high enough to bond the fiberglass fibers to the steel. It is also important, however, that the reaction temperature is not so high that it melts the fibers. Persons skilled in the art know, or can readily determine, appropriate temperatures for particular materials employed in the practice of the invention. Reaction parameters—such as the temperature employed, the quantity of reactants, and so on—are determined empirically based on the size and geometry of the part being bonded to the fiberglass fibers.

The layer adjacent to the steel is composed of a mixture of titanium powder, nickel powder, and carbon particles. These are preferably fine powders, as described in US 2007/0235126,the disclosure of which is incorporated herein by reference. A typical molar ratio of Ti:C:Ni in this layer is 1:0.7:0.5,although persons skilled in the art can readily determine other suitable molar ratios for these ingredients. The layer of initial powder mixture is typically from 1 to 3 millimeters in thickness. This layer will react with sufficient energy to melt iron and bond to the steel as it forms titanium carbide/nickel composite.

The intermediate layer is composed of nickel powder and aluminum powder. A typical molar ratio of Ni:Al in this layer is 1:1,although persons skilled in the art can readily determine other suitable molar ratios for these two ingredients. This layer provides a low ignition temperature (660° C.) to the three-layer system. The layer of initial powder mixture is typically from 1 to 3 millimeters in thickness. When this layer ignites, it will generate sufficient heat to make the first layer also react, also exothermally, and create an inter-metallic nickel/aluminum composite.

The top layer is composed of alumina powder with ends of the fiberglass fibers pressed against it. Fiberglass fibers used in the present invention typically have diameters in the range 10-100 microns. Typically, there will be from $10^2$ to $10^5$ fiberglass fibers per square centimeter in the bonding layers of the present invention. The fiberglass fibers can be provided by any suitable method. For instance, a fiberglass fabric having fiberglass fibers perpendicular to its surface can be pressed into the aluminum layer. The layer of alumina and fiberglass fibers is typically from 1 to 5 millimeters in thickness. Neither the fibers nor the alumina are reactive under the processing conditions used in the present invention. However, the alumina is heated and melts as a result of the heat generated by the two layers described above. The molten alumina wets the fiberglass fibers and bonds to them. It is noted that fiberglass fibers comprise silicon dioxide.

The liquid aluminum also bonds to layer 2, and layer 2 bonds to layer 1, as illustrated in FIG. 1. The resulting thickness of the join is typically less than 1 millimeter.

Figure 3:
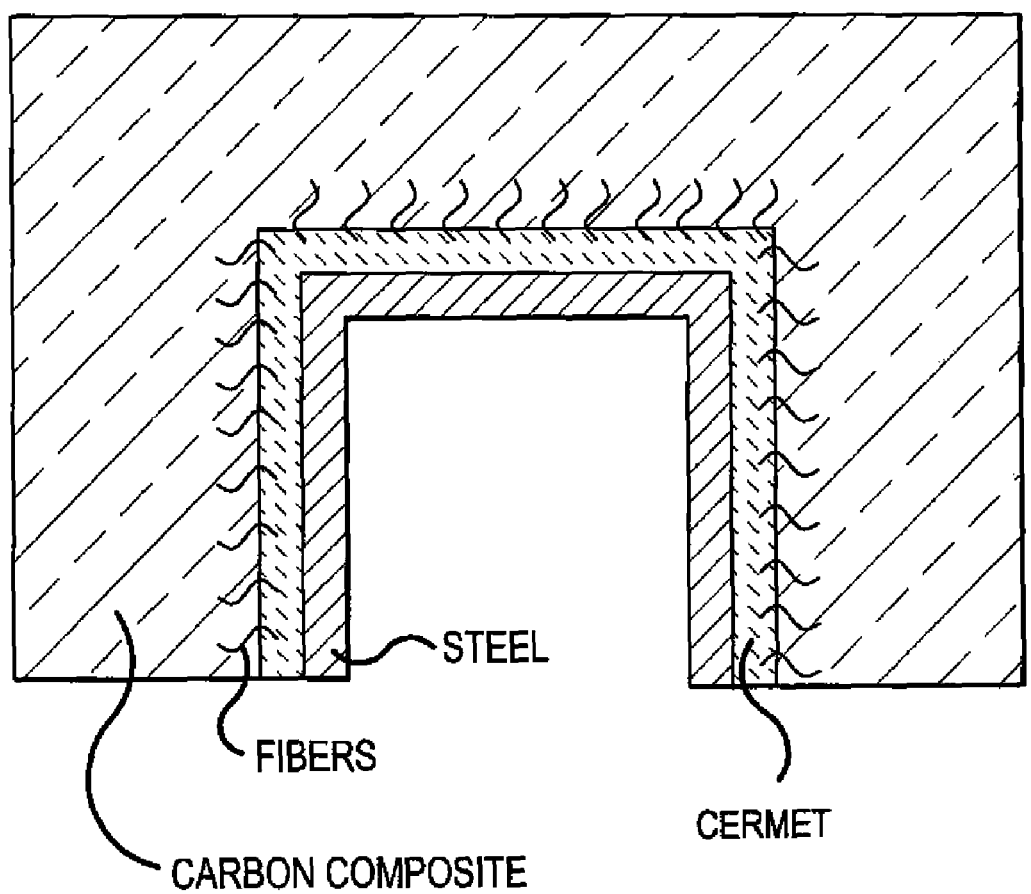
FIG. 3 schematically illustrates a steel-carbon composite hybrid article.

FIG. 3 schematically illustrates a steel-carbon composite hybrid article in which the bond between the steel and the carbon composite is a cermet (having three layers as described above) to which is adhered glass fibers which facilitate extremely strong bonding between the cermet-coated steel inner part and the carbon composite housing. It should be noted that the depiction in FIG. 3 is not to scale. The thickness of the join is typically less than 1 millimeter.

In accordance with the present invention, this three-layer system is ordered according to the coefficients of thermal expansion ("CTE") of the materials selected for the layers, in order to avoid de-bonding due to CTE mismatches. Indeed, in the above example, the graded changing of aluminum concentration between layers 2 and 3 and of nickel concentration between layers 2 and 1 provides graduated change of CTE through the joining layer. See FIG. 1.

The present invention is especially suitable in the manufacture of metal/composite constructs, in which critical features such as bolt holes are made of metal and much of the remainder of the construct is made of carbon composite.

Figure 2A:
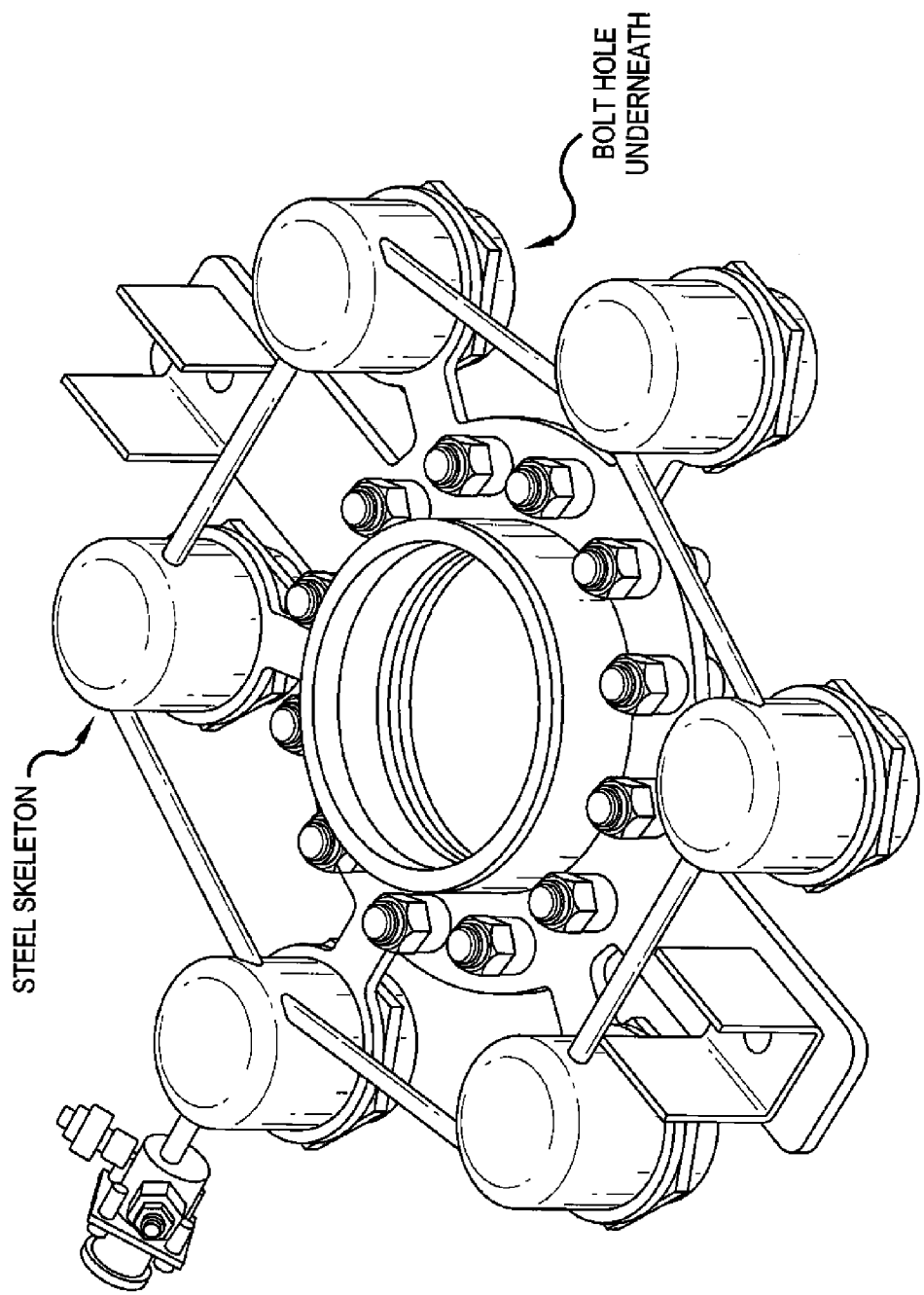
FIGS. 2A-2C schematically illustrate a metal/composite piston housing manufactured with a steel skeleton that provides bolt holes.
Figure 2B:
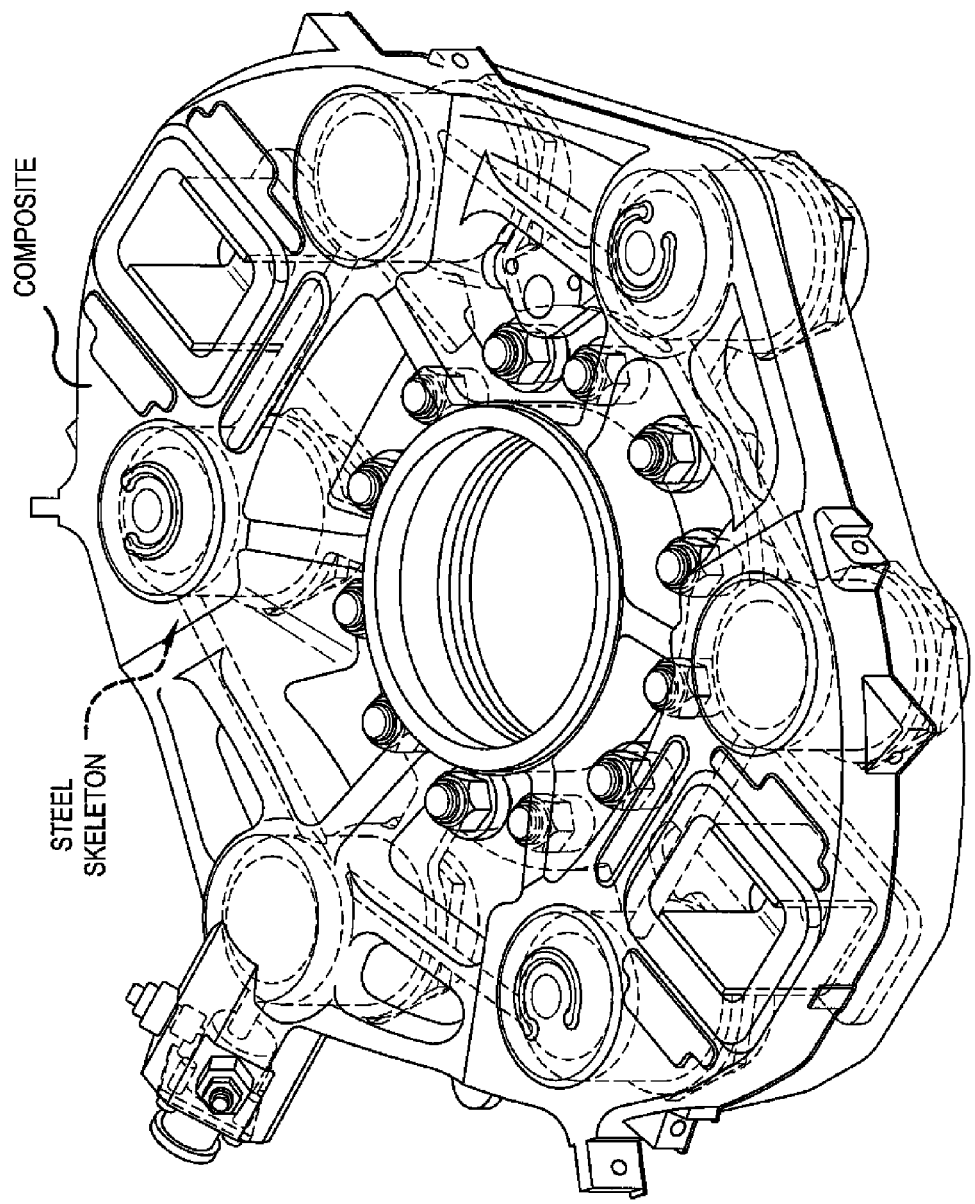
Figure 2C:
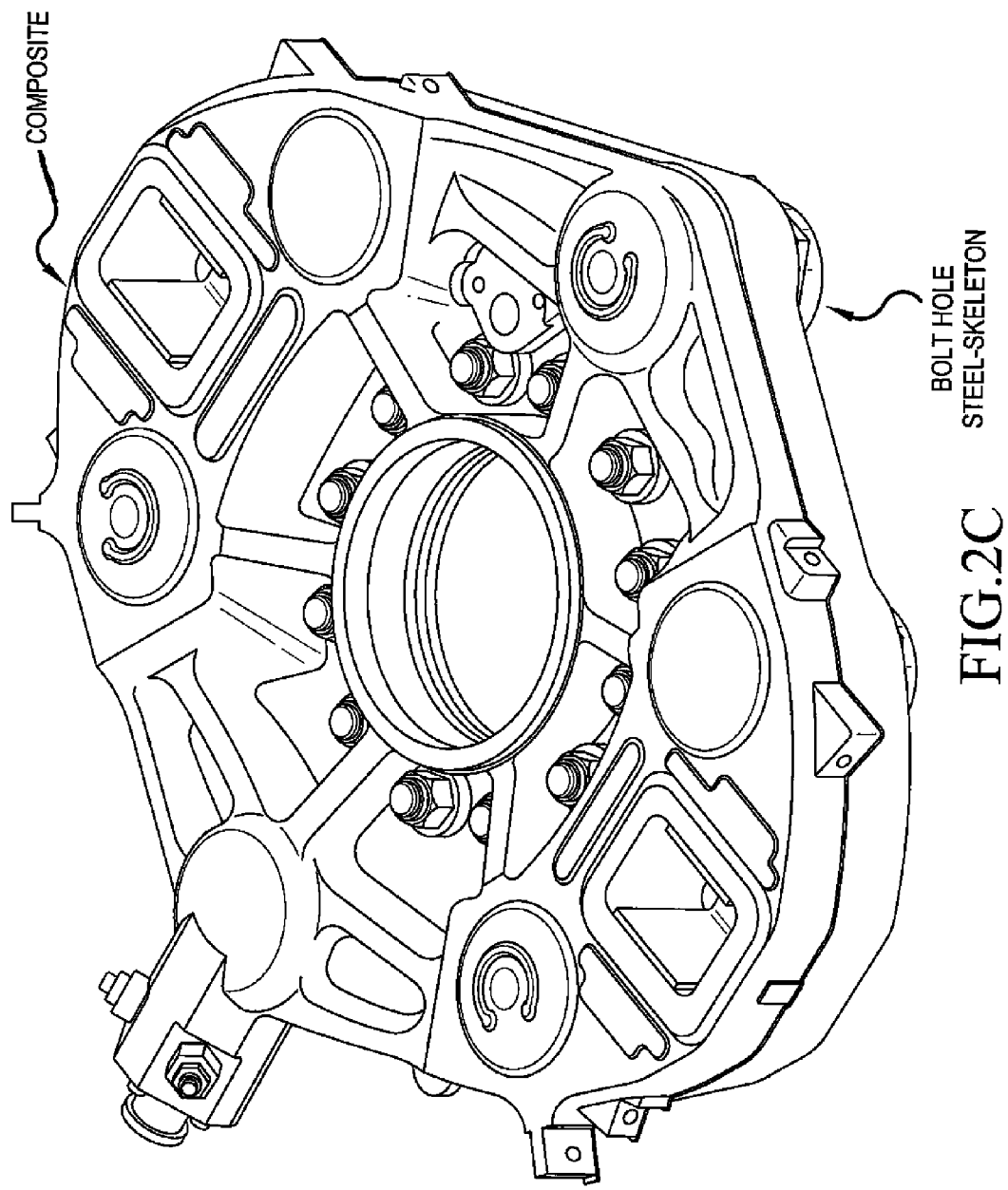

For instance, as illustrated in FIGS. 2A-2C, a metal/composite piston housing can be manufactured with a steel skeleton which provides bolt holes. Employing the process of this invention, the steel skeleton, illustrated in FIG. 2A, is bonded into a carbon composite housing which serves to hold the steel skeleton in place, to facilitate its manipulation during assembly of the complete piston housing, and to protect it from damage by the environment in which it will be used. FIG. 2B conceptually illustrates the carbon composite in schematic form so as to facilitate understanding of the manner in which it surrounds the piston housing skeleton. FIG. 2C shows a realistic view of a finished product made in accordance with the present invention. The surface of the FIG. 2C piston housing is primarily composite, but steel bolt holes protrude through the composite to permit access to the bolt holes.

Another type of final product construct that can be made in accordance with the present invention is high performance wheels, for instance, aircraft nose wheels and wheels for race cars and high end automobiles. In these wheels, the bolt holes for receiving the lugs would be present on a metal (e.g., magnesium alloy) skeleton, and the remainder of the wheel would be made of carbon composite.

The present invention has been described herein in terms of several embodiments. However, modifications and additions to these embodiments will be apparent to those skilled in the relevant arts upon a reading of the foregoing description. It is intended that all such obvious modifications and additions form a part of the present invention to the extent that they fall within the scope of the several claims appended hereto.

What is claimed is:

1. A construct comprising
a steel-fiberglass composite article comprising:
  a steel article;
  a first primary layer joined to the steel article, the first primary layer comprising nickel and titanium carbide (TiC);
  a second primary layer comprising nickel aluminum (NiAl), wherein the first primary layer is between the steel article and the second primary layer; and
  a third primary layer comprising aluminum and fiberglass fibers projecting out of the aluminum.

2. The construct of claim 1, further comprising a carbon composite bonded to the steel-fiberglass composite article.

3. The construct of claim 2, wherein the carbon composite comprises a carbon composite piston housing and the steel article comprises a steel skeleton including bolt holes, and wherein the bolt holes protrude through the carbon composite piston housing.

4. The construct of claim 1, further comprising a first intermediate layer comprising nickel, titanium carbide, and iron, wherein the first intermediate layer is between the steel article and the first primary layer.

5. The construct of claim 1, further comprising a second intermediate layer comprising nickel aluminum and nickel, wherein the second intermediate layer is between the first and second primary layers.

6. The construct of claim 1, further comprising a third intermediate layer comprising nickel aluminum and aluminum, wherein the third intermediate layer is between the second and third primary layers.

7. The construct of claim 1, wherein each of the fiberglass fibers comprises a diameter in a range of 10 microns to 100 microns.

8. The construct of claim 1, wherein the third layer comprises $10^2$ to $10^5$ fiberglass fibers per square centimeter.

9. The construct of claim 1, wherein the fiberglass fibers comprise silicon dioxide.

10. A construct comprising:
  a steel article;
  a first layer adjacent the steel article, wherein the first layer comprises titanium, nickel, and titanium carbide (TiC);
  a second layer, the second layer comprising nickel and aluminum, wherein the first layer is between the second layer and the steel article; and
  a third layer comprising alumina and fiberglass fibers projecting out of the alumina, wherein the second layer is between the first and third layers.

11. The construct of claim 10, wherein the first layer comprises titanium powder, nickel powder, and carbon particles, and the second layer comprises nickel powder and aluminum powder.

12. The construct of claim 10, wherein the first layer comprises a thickness of 1 millimeter to 3 millimeters.

13. The construct of claim 10, wherein the second layer comprises a thickness of 1 millimeter to 3 millimeters.

14. The construct of claim 10, wherein the first layer comprises a molar ratio of titanium to nickel to titanium carbide of 1:0.7:0.5.

15. The construct of claim 10, wherein the second layer comprises a molar ratio of nickel to aluminum of 1:1.

16. The construct of claim 10, wherein the third layer comprises $10^2$ to $10^5$ fiberglass fibers per square centimeter.

17. The construct of claim 10, wherein the third layer comprises a fiberglass fabric including fiberglass fibers perpendicular to a surface of the third layer pressed into an aluminum layer.

18. A method comprising:
  defining a first primary layer on a steel article, the first primary layer comprising titanium, nickel, and titanium carbide;
  defining a second primary layer comprising nickel and aluminum, wherein the first primary layer is between the second layer and the steel article;
  defining a third primary layer comprising alumina and fiberglass fibers projecting out of the alumina, wherein the second primary layer is between the first and third primary layers; and after defining the first, second, and third primary layers, generating a reaction that creates sufficient energy to melt iron, wherein the reaction bonds the first primary layer to the steel article and forms a titanium carbide and nickel composite from the titanium, nickel, and titanium carbide of the first primary layer, nickel aluminum from the nickel and aluminum of the second primary layer, and aluminum comprising fiberglass fibers projecting out of the aluminum from the alumina and fiberglass fibers of the third primary layer.

19. The method of claim 18, wherein generating the reaction comprises heating the steel article and the first, second, and third primary layers to a temperature in the range 660° C. to 1050° C.

20. The method of claim 18, wherein generating the reaction further results in the formation of:
a first intermediate layer between the first layer and the steel article, the first intermediate layer comprising nickel, titanium carbide, and iron, a second intermediate layer;
a second intermediate layer between the first and second primary layers, the second intermediate layer comprising nickel aluminum and nickel; and
a third intermediate layer between the second and third primary layers, the third intermediate layer comprising nickel aluminum and aluminum.

* * * * *